United States Patent Office 2,728,771
Patented Dec. 27, 1955

2,728,771

SEPARATION OF GAMMA PICOLINE

Gordon M. Williams, Pittsburgh, and Jack Hensel, Sewickley, Pa., assignors to Pittsburgh Coke & Chemical Company, Pittsburgh, Pa., a corporation of Pennsylvania No Drawing. Application April 23, 1953,
Serial No. 350,762

11 Claims. (Cl. 260—290)

The present invention relates to the separation of gamma picoline (4-methyl-pyridine) from mixtures thereof with other nitrogen bases, such as beta picoline (3-methyl-pyridine) and 2,6-lutidine (2,6-dimethyl-pyridine).

The principal object of the present invention is to provide a practical and commercially attractive process for the isolation of substantially pure gamma picoline from mixtures thereof with beta-picoline and/or 2,6-lutidine.

A more specific object of the invention involves treatment of the ternary mixtures of pyridine bases known industrially as the "beta-gamma picoline fraction" for the separation of substantially pure gamma picoline therefrom.

Another object of the invention is to provide a process for obtaining substantially pure gamma picoline from binary mixtures of this base with beta picoline or 2,6-lutidine as result, for example, from prior treatment of the "beta-gamma picoline fraction" in conventional manner to separate either the beta picoline or the 2,6-lutidine from the fraction.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Numerous procedures for the separation of gamma picoline from ternary or binary mixtures thereof, containing beta picoline and/or 2,6-lutidine, have been proposed and some have been employed commercially. However, each of these procedures has left much to be desired from the standpoint of economical operation, ease of operation, efficiency of recovery, and/or the realization of the base in sufficiently pure state as to be suitable for further synthesis of valuable and useful products, such as isonicotinic acid.

One such procedure has been described by Alan G. Lidstone (Journal of The Chemical Society, 1940, part 1, page 241), which involves separation of a mixture of beta and gamma picolines from their admixture with 2,6-lutidine in the form of their oxalate salts, followed by separation of the beta and gamma picoline salts by crystallization from alcohol. Fairly satisfactory results can be obtained using the process described by Lidstone on a laboratory scale but, when employed in commercial operations, the process is undesirable. This fact is indicated by the author himself, who states that treatment of batches larger than one hundred grams at a time seriously diminishes the yield.

According to the present invention, it has now been found that substantially pure gamma picoline can be separated in a commercially attractive way from mixtures of the base with beta picoline and/or 2,6-lutidine by the formation of a gamma picoline oxalate salt under the conditions noted hereinafter. Furthermore, and in contrast to the process described by Lidstone, it has been found that the isolation of the gamma picoline can be effected in nearly theoretical yields and in industrial size batches.

Broadly stated, the process of the present invention comprises the steps of dissolving oxalic acid in a mixture of gamma picoline with beta picoline and/or 2,6-lutidine, thereby forming a gamma picoline oxalate and then cooling the resulting solution to crystallize out the gamma picoline oxalate, after which the latter may be recovered and converted to gamma picoline in conventional manner, for example, by treatment with caustic and subsequent filtration or distillation. The quality of the gamma picoline thus isolated has been found to be sufficient to produce, upon oxidation, isonicotinic acid melting above 315° C. and suitable for pharmaceutical purposes.

The success of the invention is due, at least to a large extent, to the discovery that when an oxalic acid solution of a mixture of gamma picoline and beta picoline and/or 2,6-lutidine is cooled, all or at least substantially all, of the gamma picoline in the mixture can be crystallized out as a gamma picoline oxalate, while the beta picoline and 2,6-lutidine remain in solution. The process thus avoids the complex alcohol crystallization step of the Lidstone procedure and, furthermore, provides a relatively simple and commercially attractive way of recovering gamma picoline.

The oxalic acid used for the formation of the gamma picoline oxalate composition is preferably anhydrous or substantially so, although hydrates of the acid (e. g. 71.5% to 98% oxalic acid) may be used with some decrease in yields. The gamma picoline oxalate obtained, according to the present process, appears to be principally that containing one mole of picoline per mole of oxalic acid, although other base to acid compositions, such as one containing four moles of picoline per five moles of oxalic acid or two moles picoline per three moles of oxalic acid, may also be present. The quantity of oxalic acid used for the salt formation can be varied but is preferably about the theoretical required to give a 1:1, 2:3, or 4:5 molar ratio of base to acid salt of the gamma picoline, i. e., from 1 to 1½ moles of oxalic acid per mole of gamma picoline in the mixture. Less oxalic acid than that designated above may be used but, in such case, the yield of gamma picoline is lowered. Likewise, an excess of the acid over the preferred range stated may be employed, but such excess causes gummy characteristics in the crystalline oxalate salt composition.

Dissolution of the gamma picoline-containing mixture in oxalic acid to form the gamma picoline oxalate, according to the invention, can be carried out in any convenient manner. For example, the acid may be added to the picoline mixture with stirring until complete solution is obtained. Preferably, the mixture is warmed to between 50° C. and 110° C. before the acid is added thereto, since this assists the dissolution, although such heating is not essential in view of the exothermic reaction which occurs as the oxalate is formed.

Cooling of the oxalic acid solution for the purpose of crystallizing out the gamma picoline oxalate contained therein can be effected in any desirable fashion, e. g., with an external water bath. Generally, the solution is permitted to reach equilibrium conditions before cooling although this is not necessary. The temperature to which the solution is cooled for recovery of the oxalate may be widely varied with satisfactory results but, normally, need only be sufficiently low to effect complete and otherwise satisfactory crystallization, e. g., a temperature within the range of 25° to 30° C. is usually sufficient. Preferably, cooling is carried out slowly, for instance over a period from 30 to 60 minutes to permit optimum crystallization of the desired salt.

After crystallization, the oxalate is recovered by filtration, preferably purified by washing with a non-aqueous solvent followed by drying and, thereafter, converted to gamma picoline in any conventional manner, for example, by treatment with caustic followed by distillation or filtration, as noted above.

The residual liquid fraction remaining after crystallization of the gamma picoline from the binary or ternary mixture comprises an enriched beta picoline and/or 2,6-lutidine composition and is suitable for further treatment for the component separation by known methods.

The process of the invention is further illustrated, but not limited, by the following examples.

*Example I*

950 grams of beta-gamma fraction, containing 42.1% gamma picoline, 33.2% beta picoline, and 24.7% 2,6-lutidine, as determined by infra-red analysis, were placed in a five liter flask and warmed to about 70° C. 387 grams of anhydrous oxalic acid were added to the agitated mixture for complete solution of the salt with the exothermicity of the salt formation carrying the temperature to about 105° to 110° C. The solution was held at 105° to 110° C. for a few minutes to allow complete equilibrium and the solution then cooled slowly with continued agitation to 25° to 30° C. for the crystallization of the gamma picoline oxalate salt. The thick crystalline mixture resulting was transferred to a filter and the cake drawn as free of mother liquor as possible. The filtrate was recovered for possible subsequent treatment by known methods for the isolation of beta picoline and 2,6-lutidine.

The oxalate cake obtained was washed with small quantities of a non-aqueous solvent, for example, benzene, alcohol, carbon tetrachloride, and the like, to displace residual mother liquor. The wash cake was then dried for the removal of the wash solvent. One yield of oxalate cake was 748 grams or 95% of the theoretical, as based on the oxalic acid used or the gamma picoline content and for the 1:1 base to acid salt composition.

The pure gamma picoline was recovered from the dried oxalate salt by dissolving in 1000 mls. of water and adding 378 grams of sodium hydroxide, as 50% solution, for the precipitation of sodium oxalate and the liberation of the picoline. The resulting suspension was then filtered for the recovery of gamma picoline of good purity and a yield of 376 grams, representing 94% of the original gamma picoline contained in the fraction. Instead of filtering the oxalate-picoline suspension, as described above, steam distillation may be used to give an equivalent yield of gamma picoline.

*Example II*

950 grams of beta-gamma fraction, containing 29.4% gamma picoline, 36.1% beta picoline, and 34.5% 2,6-lutidine, as determined by infra-red analysis, were placed in a two liter flask and 300 grams of anhydrous oxalic acid added. The mixture was warmed to 90° to 100° C. and held at this temperature with stirring for approximately five minutes. During the warming process, the salt dissolved with the liberation of some heat. The reaction mixture was then cooled, by the application of an external water bath, to 25° to 30° C. for the crystallization of the gamma picoline oxalate salt. The cooled crystalline mass was filtered and the cake drawn as free of mother liquor as possible. The cake was then flushed free of residual mother liquor by the application of small quantities of a non-aqueous solvent and treated in the manner described in Example I, or by other known methods, for the liberation of gamma picoline of good quality and in yields of 90% to 100% of the theoretical as based on the original gamma picoline content of the fraction treated.

*Example III*

500 grams of a pyridine fraction, resulting from treatment of a beta-gamma fraction by known methods for the isolation of the beta picoline content, and containing 48.2% gamma picoline and 51.8% 2,6-lutidine, as determined by infra-red analysis, were placed in a two liter flask and warmed to 60° C. 233 grams of anhydrous oxalic acid were added and the solution stirred as the exothermic reaction raises the temperature to 100° to 105° C. The solution was then slowly cooled to 25° to 30° C. for the crystallization of the oxalate salt and treated in the manner described in Examples I and II for the isolation of 474 grams of dried oxalate salt corresponding to a theoretical yield as based on the oxalic acid used and the gamma picoline contained in the original fraction. The gamma picoline was sprung from the salt as described in the previous examples, or by other known methods, for the realization of 229 grams of gamma picoline representing a 95% recovery of the original gamma picoline content.

As will be appreciated from the foregoing, the present process permits gamma picoline to be separated substantionally quantitatively in a pure state and in a commercially attractive way from mixtures thereof with beta picoline and/or 2,6-lutidine. The process of the invention can be successfully used for the recovery of gamma picoline from any binary or ternary mixture thereof with beta picoline and 2,6-lutidine. Thus, for example, "beta-gamma fractions" as derived from coal tar bases and containing from 20% to 50% gamma picoline, 30% to 60% beta picoline and 10% to 40% 2,6-lutidine may be satisfactorily employed. Similarly, binary mixtures comprising from 20% to 80% gamma picoline with 20% to 80% beta picoline or 2,6-lutidine can be effectively treated, according to the invention, for substantially complete recovery therefrom of the gamma picoline therein. It will also be appreciated that the mixtures treated may contain minor amounts of other compounds normally associated with gamma and beta picoline and 2,6-lutidine, for example, 2,3-lutidine and alpha picoline which are occasionally found as impurities in beta-gamma fractions.

Since many wide and varied modifications of the invention will be apparent to those skilled in the art, it is not intended that the scope of this invention shall be limited by the foregoing description except as indicated by the following claims.

We claim:

1. A process for separating gamma picoline from a mixture thereof with other basic material consisting essentially of at least one member of the group consisting of beta picoline and 2,6-lutidine, said process comprising the steps of forming a solution consisting essentially of oxalic acid dissolved in said mixture and thereafter cooling said solution to crystallize out the gamma picoline in the form of an oxalate salt to the substantial exclusion of the other basic material originally admixed therewith.

2. The process of claim 1, wherein the oxalic acid is anhydrous.

3. The process of claim 1, wherein gamma picoline is separated from a ternary mixture comprising, in addition to said gamma picoline, beta picoline and 2,6-lutidine.

4. The process of claim 3, wherein said ternary mixture comprises from 20% to 50% gamma picoline, 30% to 60% beta picoline and 10% to 40% 2,6-lutidine.

5. The process of claim 1, wherein gamma picoline is separated from a binary mixture thereof with 2,6-lutidine, said mixture comprising from 20% to 80% gamma picoline and 20% to 80% 2,6-lutidine.

6. The process of claim 1, wherein gamma picoline is separated from a binary mixture thereof with beta picoline, said mixture comprising from 20% to 80% gamma picoline and 20% to 80% beta picoline.

7. The process of claim 1, wherein from one to 1½ moles of oxalic acid is dissolved in the mixture per mole of gamma picoline.

8. The process of claim 1, wherein the oxalic acid is dissolved by heating the same with the mixture.

9. The process of claim 1, wherein said mixture includes, as an impurity therein, at least one member of the group consisting of 2,3-lutidine and alpha picoline.

10. A process for separating gamma picoline from a mixture thereof with other basic material consisting essentially of at least one member of the group consisting of beta picoline and 2,6-lutidine, said process comprising the steps of heating said mixture with from 1 to 1½ moles of oxalic acid per mole of gamma picoline to form a solution consisting essentially of oxalic acid dissolved in said mixture and thereafter cooling said solution to a temperature of from 25° to 30° C. to crystallize out the gamma picoline in the form of an oxalate salt to the substantial exclusion of the other basic material originally admixed therewith.

11. The process of claim 10, wherein the crystallized oxalate is recovered by filtration, purified and thereafter converted to gamma picoline.

References Cited in the file of this patent

UNITED STATES PATENTS

| | | |
|---|---|---|
| 2,459,191 | Slagle et al. | Jan. 18, 1949 |
| 2,459,192 | Slagle et al. | Jan. 18, 1949 |
| 2,516,370 | Cracas | July 25, 1950 |

OTHER REFERENCES

Lidstone, J. Chem. Soc. 1940, pp. 241–243.